United States Patent [19]
Gay et al.

[11] Patent Number: 4,874,599
[45] Date of Patent: Oct. 17, 1989

[54] MAGNESIUM FLUORIDE RECOVERY METHOD

[75] Inventors: Richard L. Gay, Canoga Park; Donald E. McKenzie, Woodland Hills, both of Calif.

[73] Assignee: Rockwell International Corporation, El Segundo, Calif.

[21] Appl. No.: 798,080

[22] Filed: Nov. 14, 1985

[51] Int. Cl.$^4$ ................................................ C01F 5/28
[52] U.S. Cl. ..................................... 423/490; 423/20; 423/178
[58] Field of Search .......................... 423/20, 178, 490

[56] References Cited

U.S. PATENT DOCUMENTS 2,733,126 1/1956 Spiegler ................................. 423/20
2,914,378 11/1959 Kennedy ............................... 423/20

FOREIGN PATENT DOCUMENTS 2504554 10/1982 France ................................... 423/20
853343 11/1960 United Kingdom .................. 423/20

Primary Examiner—John Doll
Assistant Examiner—Jeffrey Edwin Russel
Attorney, Agent, or Firm—H. Fredrick Hamann; Harry B. Field; David C. Faulkner

[57] ABSTRACT

A method of obtaining magnesium fluoride substantially free from radioactive uranium from a slag containing the same and having a radioactivity level of at least about 7000 pCi/gm. The slag is ground to a particle size of about 200 microns or less. The ground slag is contacted with an acid under certain prescribed conditions to produce a liquid product and a particulate solid product. The particulate solid product is separated from the liquid and treated at least two more times with acid to produce a solid residue consisting essentially of magnesium fluoride substantially free of uranium and having a residual radioactivity level of less than about 1000 pCi/gm. In accordance with a particularly preferred embodiment of the invention a catalyst and an oxidizing agent are used during the acid treatment and preferably the acid is sulfuric acid having a strength of about 1.0 Normal.

14 Claims, No Drawings

MAGNESIUM FLUORIDE RECOVERY METHOD

STATEMENT OF GOVERNMENT INTEREST

The Goverment has rights in this invention pursuant to Contract (or Grant) No. DE-ATO3-83SF11948 awarded by the U.S. Department of Energy.

Broadly, the present invention is directed to the volume reduction of a radioactive waste material. More specifically, the invention deals with the recovery of decontaminated magnesium fluoride from a slag obtained as a byproduct in the reduction of uranium tetrafluoride with metallic magnesium.

Enriched uranium metal (containing from 3 to 95+% of the 235 isotope) is a valuable source of fuel for use with nuclear reactors. In the production of such fuel it has been customary to react enriched uranium tetrafluoride with magnesium metal in a autoclave or retort. When the reaction is complete, uranium metal is separated bodily from the slag which because of its lighter weight rises to the top of the molten uranium metal during the reaction. The slag will contain the free metals magnesium and uranium as well as oxides, fluorides or mixed oxides and fluorides of these metals. Because of its value as a fuel, various methods have been proposed for the recovery of the uranium from such slag. It has been proposed to contact such a slag at an elevated temperature with flourine gas to recover the uranium as $UF_6$. Fluorine is, of course, both expensive and highly corrosive, thus making such a process complex and expensive.

In U.S. Pat. No, 2,733,126 it is proposed that the slag be crushed and roasted in air at a temperature between about 600° C. and 1000° C. and then subsequently treated at a temperature between 200° C. and 300° C. with concentrated sulfuric acid to react with the fluorides and expel fluorine as hydrogen fluoride, and convert the magnesium and uranium to sulfates, The uranium sulfate goes into solution in the acid and is separated for recovery of the valuable enriched uranium values therefrom.

U.S. Pat. No. 2,897,048 describes another process for the recovery of uranium from a magnesium fluoride slag containing the same. In accordance with the process disclosed therein, the slag is ground and roasted with sodium carbonate in air. Thereafter the roasted slag is neutralized with an acid an leached with an aqueous solution containing sodium bicarbonate to dissolve the uranium. A product liquor is produced which contains the uranium. The product liquor is separated from the residue and reacted with an alkali metal hydroxide to precipitate the uranium as diuranate.

The principal purpose of the foregoing processes are recovery of the valuable enriched uranium, but little consideration is given to the remaining radioactive residue.

Recently there has developed an interest in uranium metal for its metallurgical properties and the magnesium reduction process is being applied to large quantities of depleted uranium (less than about 0.3 wt % of the 235 isotope in the uranium). The resulting waste magnesium fluoride slag is contaminated with about 2 wt % uranium and has a radioactivity level of approximately 7000 pCi/gm. This is sufficient radioactivity for the material to be classified as a low-level radioactive waste. In view of the large quantities of such waste being generated and the drastic increases in radioactive waste disposal costs, a method of reducing the volume of such waste clearly is needed.

SUMMARY OF THE INVENTION

The present invention provides a method of obtaining magnesium fluoride substantially free from any radioactive uranium from a slag formed in the production of metallic uranium by the reduction of depleted uranium tetrafluoride with metallic magnesium. The slag typically contains, among other things, free magnesium and uranium metal as well as the oxides and flourides of such metals. In addition, the slag will typically have a radioactivity level of at least about 7000 pCi/gm (pico curies/gram).

The method comprises the sequential steps of grinding the slag to a median particle size of about 200 microns or less and contacting the ground slag in a reaction zone with an acid having a strength of from about 0.5 to 1.5 N for a time of from about 4 to 20 hours. The reaction zone is maintained at a temperature within the range of from about 60° to 90° C. and the weight ratio of slag to acid is maintained within the range of from about 1:2 to 1:6 to produce a liquid product and a particulate solid product. The liquid product containing dissolved radioactive uranium components is removed and the particulate solid product is then treated again with acid in substantially the same manner as hereinbefore described. The particulate solid product resulting from the second acid treatment is recovered and treated at least one more time with acid to produce a solid residue consisting essentially of magnesium fluoride substantially free of uranium and having a residual radioactivity level of less than about 100 pCi/gm.

In accordance with one preferred aspect of the invention, an acid is sulfuric acid and has a strength of about 1.0 N. In accordance with another preferred aspect of the invention, an oxidizer and a catalyst were added during the acid treatment. The preferred oxidizers are nitric acid and magnesium dioxide and the preferred catalyst comprises iron. It is an advantage of the present invention that substantially complete separation of the radioactive uranium from the magnesium fluoride can be effected without prior roasting of the slag under oxidizing conditions and the cost associated therewith.

OBJECTS OF THE INVENTION

It is an object of the invention to provide a process for the recovery of magnesium fluoride substantially free of radioactivity from a radioactive magesium-uranium fluoride slag.

It is another object of the invention to provide a method of recovering magnesium fluoride from a magnesium-uranium fluoride slag without the necessity of any preoxidation or roasting step.

It is a further object of the invention to provide a method of recovering magnesium fluoride from a radiactive magnesium-uranium flouride slag in which the magnesium fluoride product as a sufficiently low radioactivity level that it may be disposed of without nuclear restrictions.

It is also an object of the invention to provide a method of reducing the volume of a radioactive magnesium fluoride slag whereby the cost of disposal and storage is substantially reduced.

It is also an object of the invention to provode a method for the recovery of uranium from a magnesium-uranium fluoride slag in which a pure uranium product is obtainable substantially free of any impurities.

These and other objects of the invention will be more apparent from the following detailed description.

DETAILED DESCRIPTION OF THE INVENTION

The present invention provides a method of treating a radioactive slag formed in the production of metallic uranium by the reduction of uranium tetrafluoride with metallic magnesium in a retort such that the volume of material requiring disposal in a controlled disposal site is substantially reduced. The method also provides for the recovery of magnesium fluoride substantially free from radioactive uranium from such a slag. Typically, such a slag will contain free magnesium and uranium metal as well as oxides and fluorides of such metals. Such slags generally have a uranium content of about 2 to 7 wt % of the slag of which less than about 0.3 wt % of the uranium will consist of the 235 isotope, the balance comprising uranium 238. Such a slag will have a radioactivity level of about 7000 pCi/gm or higher. The method of the present invention comprises a series of sequential treatment steps.

In accordance with the method of the present invention, the slag of the type above described, is first pulverized or ground to a median particle size of about 200 microns or less. Larger sizes may be treated in accordance with the present invention, however the penalty is that a longer time is required for the subsequent acid treatments. Alternatively of course, smaller sizes will decrease the time to some extent, however, the economic penalty incurred in reducing the size is generally not offset by the time saved. The preferred particle size therefore for practice of the present invention is about 200 microns. The manner in which the slag is crushed or ground is not particularly critical, thus it has been found that either wet or dry ball-milling is equally effective. Other pulverization or grinding processes will also be apparent to those skilled in the art and are equally applicable.

It is an advantage of the present invention that the ground material does not require any high temperature oxidation treatments such as roasting in the presence of air along with the attendant cost incurred therewith. Rather, the ground material may be treated as is. The second sequential step of the method of the present invention involves reacting the ground slag with a mineral acid having a strength of from about 0.1 to 5 N. Typical mineral acids are sulfuric acid, hydrochloric acid and nitric acid. It has been found that all three acids are effective in decontaminating the magnesium fluoride. Sulfuric acid is the preferred acid for use since it does not evaporate with extended leach times. Preferably, the slag is contacted with a sulfuric acid having a strength of from about 0.5 to 1.5 normal. Under such conditions it has been found that a time of from about 4 to 20 hours and a temperature of from about 60° to 90° C. are sufficient to achieve a high solubilization of the radioactive uranium. Advantageously, the slag to acid weight ratio is within the range from about 1:2 to 1:6.

The presence of an oxidizer and a catalyst have also been found to further enhance the separation of radioactive uranium from the magnesium fluoride. Only a catalyst amount of iron is required, thus amounts as small as about 0.01 wt % based on the toal weight of acid and slag are sufficient to catalyze the desired reactions.

Certain preferred oxidizers also may be added during the acid treatment step. The particularly preferred oxidizing agents are nitric acid and manganese dioxide. However, the combination of sulfuric acid and nitric acid dissolves more of the magnesium fluoride than the sulfuric acid-manganese dioxide combination. Thus, magnesium dioxide is the preferred oxidizing agent. In either instance, the amount of oxidizing agent is selected to convert all of the uranium in the slag to a hexavalent state. The exact quantity will, of course, vary depending upon the particular slag utilized. However, such determination is readily within the skill of one versed in the art.

Following the second step in which there is produced both a liquid product and a particulate solid product, the liquid and solid are separated either by decanting, filtration, centrifuging or other common separation process. The particulate solid product then is preferably washed and subjected to another acid treated as hereinbefore described. This second treatment and particulate solid separation is repeated at least one more time to produce a solid residue consisting essentially of magnesium fluoride substantially free of uranium and having a residual radioactivity level of less than about 100 pCi/gm. Indeed, in accordance with the present invention it is possible to reduce such radioactivity level to less than about 30 pCi/gm such that the magnesium fluoride may be disposed of as a commercial waste rather than a radioactive waste with substantial savings in cost.

In addition, the liquid product which contains substantially all of the radioactive uranium values may be subsequently treated to separately recover the uranium therefrom and which will have a substantially smaller volume than that of the original slag. Such separation is accomplished utilizing known technology such as the use of ion exchange resins, sodium carbonate, precipitation and the like.

The following Example will more clearly illustrate the practice of the present invention. The following procedure was utilized.

EXAMPLE

An amount of pulverized magnesium fluoride waste slag was placed in beakers of acid having a normality within the range from 0.5 to 5. A predetermined amount of an oxidant (either $HNO_3$ or $MnO_2$) was added along with about 1 gram iron sulfate catalyst for certain of the tests. The vessels were placed on hot plates and the mixture stirred at a temperature of about 80° C. for the desired period of time. The vessels were then removed from the hot plates and the particulates were allowed to settle. The clear supernatant was removed and water was added to the residue and stirred for several minutes. The supernatant was again removed after the particulates had settled. This washing procedure was repeated two or three times to remove the mother liquor. The particulates were dried, weighed and assayed. In some tests, the particulates were then reball-milled and re-leached. Counting samples of both the washed particulates and the supernatant were prepared to determined uranium distribution in the system. Representative results of these tests are set forth in the table below.

TABLE

ACID LEACH DECONTAMINATION TEST RESULTS (IN $H_2SO_4$ @ 80° C.)

| Test No. | Acid Leach No. | Oxidizer | Leach Time (hours) | Initial Activity pCi/gm | Ball-milling Time Between Leaches (hours) | Activity in $MgFl_2$ Residue (pCi/gm) | Remarks |
|---|---|---|---|---|---|---|---|
| 1 | 1 | $HNO_3$ | 13 | 9520 ± 270 | | 1350 ± 310 | TESTS 1-2 |
|   | 2 | $HNO_3$ | 17 | | None | 410 ± 70 | particles having |
|   | 3 | $HNO_3$ | 19.5 | | None | 300 ± 30 | a size of less |
|   |   |   |   |   |   |   | than 150 μm but |
| 2 | 1 | $MnO_2$ | 13 | 15890 ± 500 | | 7160 ± 230 | greater than 38 μm |
|   | 2 | $MnO_2$ | 17 | | None | 2280 ± 260 | plus Fe catalyst |
|   | 3 | $MnO_2$ | 19.5 | | None | 30 ± 10 | with continuous |
|   |   |   |   |   |   |   | stirring |
| 3 | 1 | $HNO_3$ | 13 | 4640 ± 100 | | 780 ± 10 | TESTS 3-10 |
|   | 2 | $HNO_3$ | 17 | | None | 490 ± 25 | |
|   | 3 | $HNO_3$ | 19.5 | | 16 | 150 ± 20 | particles |
|   | 4 | $HNO_3$ | 16 | | 16 | 65 ± 10 | having a size |
|   |   |   |   |   |   |   | less than 38 μm |
| 4 | 1 | $MnO_2$ | 13 | 7720 ± 70 | | 2210 ± 30 | plus Fe catalyst |
|   | 2 | $MnO_2$ | 17 | | None | 490 ± 25 | with continuous |
|   | 3 | $MnO_2$ | 19.5 | | 16 | 195 ± 10 | stirring |
|   | 4 | $MnO_2$ | 16 | | 16 | 80 ± 10 | |
| 5 | 1 | $HNO_3$ | 5 | 7020 ± 270 | | 990 ± 40 | |
|   | 2 | $HNO_3$ | 5 | | 5 | 210 ± 20 | |
|   | 3 | $HNO_3$ | 5 | | 16 | 210 ± 80 | |
|   | 4 | $HNO_3$ | 5 | | 14 | 40 ± 5 | |
| 6 | 1 | $MnO_2$ | 5 | 7300 ± 60 | | 4393 ± 950 | |
|   | 2 | $MnO_2$ | 5 | | 5 | 490 ± 25 | |
|   | 3 | $MnO_2$ | 5 | | 16 | 195 ± 10 | |
|   | 4 | $MnO_2$ | 5 | | 14 | 80 ± 10 | |
| 7 | 1 | $HNO_3$ | 11.5 | 7000 ± 710 | | 840 ± 15 | |
|   | 2 | $HNO_3$ | 11.5 | | 12 | 90 ± 5 | |
|   | 3 | $HNO_3$ | 15 | | 9.5 | 60 ± 25 | |
| 8 | 1 | $MnO_2$ | 11.5 | 4100 ± 70 | | 1530 ± 100 | |
|   | 2 | $MnO_2$ | 11.5 | | 12 | 280 ± 15 | |
|   | 3 | $MnO_2$ | 15 | | 9.5 | 125 ± 10 | |
| 9 | 1 | $HNO_3$ | 11.5 | 7470 ± 290 | | 370 ± 15 | |
|   | 2 | $HNO_3$ | 11.5 | | 12 | 190 ± 40 | |
|   | 3 | $HNO_3$ | 11.5 | | 9.5 | 75 ± 10 | |
| 10 | 1 | $MnO_2$ | 11.5 | 7050 ± 270 | | 470 ± 10 | |
|   | 2 | $MnO_2$ | 11.5 | | 12 | 175 ± 10 | |
|   | 3 | $MnO_2$ | 11.5 | | 9.5 | 60 ± 10 | |

From the foregoing table it is seen that in three treatments the radioactivity of the magnesium fluoride product was reduced to substantially less than 500 pCi/gm which is the lower limit of concern under present regulations with respect to disposal of radioactive waste. Further, it will be seen that in several instances the radioactivity level is reduced to less than about 100 pCi/gm which approaches the natural background level of ordinary dirt thus making this product suitable for disposal in a nonradioactive disposal site. Further, the radioactive uranium which comprises only 2 wt % of the slag is now in the form from which it is readily recoverable using conventional techniques. Thus this example also demonstrates the efficacy of the present invention to reduce the volume of radioactive waste.

While the foregoing invention has been described with respect to what is now considered to be the preferred embodiment, it will be understood that it should not be limited to the details given herein and that it may be modified within the scope of the appended claims.

What is claimed and desired to be secured by Letters Patent of the United States is:

1. A method of obtaining magnesium fluoride substantially free from radioactive uranium from a slag formed in the production of metallic uranium by the reduction of depleted uranium tetrafluoride with metallic magnesium in a retort wherein the slag contains the free metals magnesium and uranium and also oxides and fluorides of said metals, said slag having a radioactivity level of at least about 7,000 pCi/gm, which method comprises the sequential steps of:
   (a) grinding said slag to a median particle size of about 200 microns;
   (b) contacting said ground slag in a reaction zone with an acid having a strength of from about 0.5 to 1.5 N for a time of from about 4 to about 20 hours in the presence of a catalytic amount of iron, said reaction zone being maintained at a temperature within the range of from about 60° to 90° C. and the weight of ratio of slag to acid being within the range of from about 1:2 to 1:6 to produce a liquid product and a particulate solid product;
   (c) removing the liquid product from step (b);
   (d) treating the particulate solid product from step (c) in accordance with step (b); and
   (e) repeating steps (c) and (d) at least one more time to produce a solid residue consisting essentially of magnesium fluoride substantially free of uranium and having a residual radioactivity level of less than about 1000 pCi/gm.

2. The method of claim 1 wherein said acid has a strength of about 1.0 N.

3. The method of claim 1 wherein in step (b) said temperature is maintained at about 75° C.

4. The method of claim 3 wherein in step (b) the reaction time is about 10 hours.

5. The method of claim 1 wherein said acid solution is recovered and treated for the separate recovery of uranium therefrom.

6. The method of claim 5 wherein said acid solution is passed through an ion exchange resin for selective recovery of uranium therefrom.

7. The method of claim 1 wherein said slag is treated without any prior art oxidation treatment.

8. A method of obtaining magnesium fluoride substantially free from radioactive uranium from a slag formed in the production of metallic uranium by the reduction of depleted uranium tetrafluoride with metallic magnesium in a retort wherein the slag contains the free metals magnesium and uranium and also oxides and fluorides of said metals, said slag having a radioactivity level of at least about 7000 pCi/gm, which method comprises the sequential steps of:
   (a) grinding said slag to a median particle size of about 200 microns;
   (b) contacting said ground slag in a reaction zone with sulfuric acid having a strength of from about 0.5 to 1.5 N for a time of from about 4 to about 20 hours, said reaction zone being maintained at a temperature within the range of from about 60° to 90° C. and the weight ratio of slag to acid being within the range of from about 1:2 to 1:6 to produce a liquid product and a particulate solid product;
   (c) removing the liquid product from step (b);.
   (d) treating the particulate solid product from step (c) in accordance with step (b); and
   (e) repeating steps (c) and (d) at least one more time to produce a solid residue consisting essentially of magnesium fluoride substantially free of uranium and having a residual radioactivity level of less than about 1000 pCi/gm.

9. A method of obtaining magnesium fluoride substantialy free from radioactive uranium from a slag formed in the production of metallic uranium by the reduction of depleted uranium tetrafluoride with metallic magnesium in a retort wherein the slag contains the free metals of magnesium and uranium and also oxides and fluorides of said metals, said slag having a radioactivity level of at least about 7000 pCi/gm, which methods consists essentially of the steps of
   (a) grinding said slag to median particle size of less than about 200 microns;
   (b) contacting said ground slag without prior oxidation treatment in a reaction zone with sulfuric acid having a strength of from about 0.5 to 1.5 N for a time of from about 4 to 20 hours in the presence of an iron catalyst and an oxidizer selected from the group consisting of nitric acid and manganese dioxide, said reaction zone being maintained at a temperature within the range of from about 60° to 90° C. and the weight ratio of slag to acid being within the range of from about 1:2 to 1:6 to produce a liquid product and a particulate solid product;
   (c) removing the liquid product from step (b);
   (d) treating the particulate solid product from step (c) in accordance with step (b) and
   (e) repeating steps (c) and (d) at least one more time to produce a solid residue consisting essentially of magnesium fluoride substantially free of uranium and having a residual radioactivity level of less than about 1000 pCi/gm.

10. The method of claim 9 wherein said acid has a strength of about 1.0 N.

11. The method of claim 10 wherein in step (b) said temperature is maintained at about 75° C.

12. The method of claim 9 wherein in step (b) the reaction time is about 10 hours.

13. The method of claim 9 wherein said acid solution is recovered and treated for the separate recovery of uranium therefrom.

14. The method of claim 13 wherein said acid solution is passed through an ion exchange resin for selective recovery of uranium therefrom.

* * * * *